July 10, 1956
R. H. WHISLER, JR
2,753,958
SHOCK ABSORBER WITH ROD SEAL
Filed Dec. 15, 1953
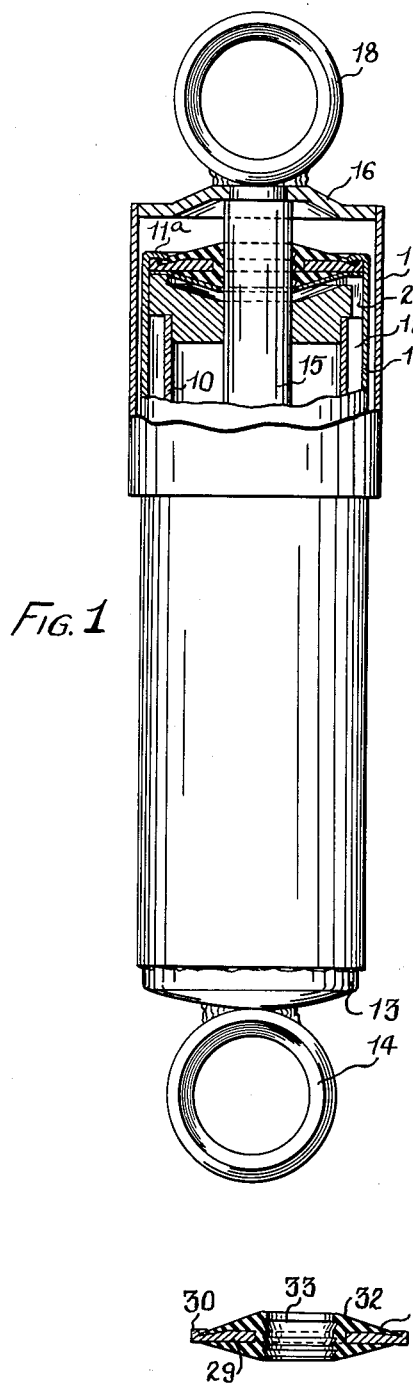
Fig. 1
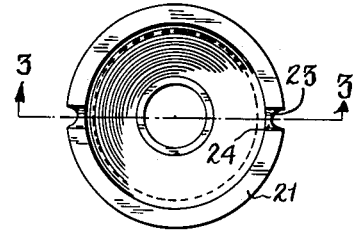
Fig. 2
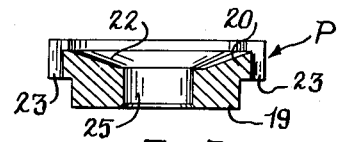
Fig. 3
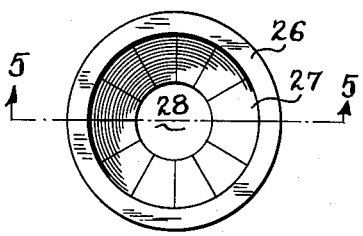
Fig. 4
Fig. 5
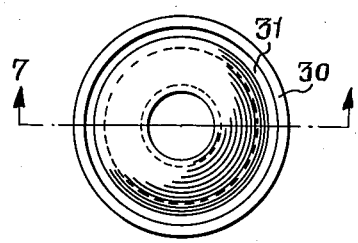
Fig. 6
Fig. 7
INVENTOR.
RALPH H. WHISLER JR.
BY Hudson, Boughton,
Williams, David & Hoffmann
ATTORNEYS

United States Patent Office 2,753,958
Patented July 10, 1956

2,753,958

SHOCK ABSORBER WITH ROD SEAL

Ralph H. Whisler, Jr., Euclid, Ohio, assignor to The Gabriel Company, Cleveland, Ohio, a corporation of Ohio Application December 15, 1953, Serial No. 398,323

6 Claims. (Cl. 188—100)

This invention relates to a shock absorber and more particularly to a direct double acting hydraulic shock absorber.

An object of the invention is to provide in a direct double acting hydraulic shock absorber closure means for the inner or working cylinder of the shock absorber and for the outer or reservoir cylinder thereof and which closure means includes packing for the piston rod and is simple in construction, is formed of relatively few inexpensive parts that are easily assembled and is efficient in operation.

Another object is to provide in a direct double acting hydraulic shock absorber closure means as referred to in the first named object and which includes provision for wiping hydraulic fluid from the piston rod and for returning said fluid to the reservoir of the shock absorber.

A further object is to provide a closure member for a fluid shock absorber which includes a piston rod packing as an integrated or unitary part thereof.

Further and additional objects and advantages not hereinbefore specified will become apparent hereinafter during the detailed description of an embodiment of the invention which is to follow and which embodiment is illustrated in the accompanying drawing forming a part of this specification and wherein, Fig. 1 is an elevational view of a direct double acting hydraulic shock absorber with certain of the parts at the upper end of the shock absorber broken away and shown in section to illustrate the invention.

Fig. 2 is a plan view of the closure plug for the upper end of the inner or working cylinder of the shock absorber shown in Fig. 1.

Fig. 3 is a transverse sectional view taken substantially on line 3—3 of Fig. 2 looking in the direction of the arrows.

Fig. 4 is a plan view of the spring metal disk used in the construction embodying the invention.

Fig. 5 is a transverse sectional view taken substantially on line 5—5 of Fig. 4 looking in the direction of the arrows.

Fig. 6 is a plan view of the combined closure for the reservoir cylinder of the shock absorber and the piston rod packing, and Fig. 7 is a transverse sectional view taken substantially on line 7—7 of Fig. 6 looking in the direction of the arrows.

The invention may be embodied in various forms of shock absorbers but it is illustrated as embodied in a direct double acting hydraulic shock absorber for automotive vehicles and which comprises an inner or pressure cylinder 10 that is surrounded in radially spaced relationship by an outer or reservoir cylinder 11. The lower end of the inner or pressure cylinder 10 is closed by a closure plug (not shown) that is provided with means affording communication with the reservoir 12 between the inner and outer cylinders 10 and 11 as will be well understood in the art. This closure plug means may be provided with valve means controlling the flow of hydraulic fluid from the inner cylinder to the reservoir and from the latter to the inner cylinder during the impact and recoil strokes of the piston.

The lower end of the outer or reservoir cylinder 11 is closed by a closure cap 13 suitably secured to the cylinder and provided on its outer side with an attaching eye 14. The upper ends of the inner or pressure cylinder 10 and the outer or reservoir cylinder 11 are closed by a suitable closure means that embodies the invention and which will be described in detail hereinafter. A piston rod 15 is slidably supported by said closure means and extends into the inner or pressure cylinder 10 and has mounted on its inner end a suitable piston as will be well understood.

The piston may be provided with suitable valve means controlling the flow of hydraulic fluid past the piston during the movement of the latter in opposite directions within the inner working or pressure cylinder as the shock absorber functions all as will be well understood. The direct double acting hydraulic shock absorber in which the invention has been embodied for purposes of illustration may be similar to the shock absorber shown in Beecher United States Patent No. 2,396,227, issued March 12, 1946.

A disk 16 is rigidly connected to the piston rod outwardly of the cylinders and said disk has rigidly secured to it as by welding a tubular skirt 17 which telescopes over the outer or reservoir cylinder 11 in spaced relation thereto and which constitutes a tubular guard skirt. Secured to the disk 16 and the piston rod 15 on the upper side of the disk is an upper attaching eye 18. As will be well understood in the art, the lower eye 14 can be attached to the axle of the vehicle on which the shock absorber is used while the upper eye 18 can be attached to the vehicle chassis so that relative movement between the axle and chassis will cause reciprocation of the piston rod 14 and of the piston carried thereby and located within the working cylinder 10.

The description heretofore given is well understood in the art and hence such parts as the piston, the valve means on the piston, the closure member for the lower end of the working cylinder 10 and the valve means carried by said closure member have not been illustrated herein since per se they form no part of the present invention.

The closure means for the upper end of the inner working or pressure cylinder and for the upper end of the reservoir cylinder and including the packing for the piston rod will now be described as these elements embody the present invention. As clearly shown in Figs. 1, 2 and 3 the upper end of the inner or working cylinder 10 is closed by a plug member P which has a reduced cylindrical portion 19 that interfits the upper end of the cylinder 10 and a portion 20 of enlarged diameter which overlies and against which the upper end of the cylinder 10 abuts with said portion 20 interfitting the interior of the outer or reservoir cylinder 11 inwardly of the outer end of the latter. The plug member P may be rigidly connected to the inner and outer cylinders in any preferred way as by press fits or by welding or otherwise.

The portion 20 of the plug member is provided on its upper outer side with a raised circular rib 21 at its circumference and inwardly of said rib the portion 20 is of dished or concave configuration as indicated at 22. The circumference of the portion 20 of the closure member is provided with one or more longitudinally extending grooves 23 and in the form shown in the drawings there are two such grooves 23 arranged diametrically opposite each other in the plane of Fig. 3, although it will be understood that said grooves might vary in number and be otherwise arranged. Only one of the grooves 23 is illustrated in Fig. 1, inasmuch as the section in Fig. 1 is irregularly taken as distinguished from being diametrically taken. The rib 21 is provided with short radially extending grooves 24 which place the longitudinally extending grooves 23 in communication with the concave or dished outer end 22 of the closure member. It will also be noted that the longitudinal grooves 23 communicate with the reservoir 12. The closure member P is provided with a central opening 25 in which the piston rod 15 slides.

Outwardly of the closure member P there may be a spring disk having a circular rim 26 that is supported by the annular rib 21 of the closure member, although this spring disk may be omitted and probably would be omitted in many sizes of shock absorber. Inwardly of the rim 26 the spring disk is provided with a circular series of spring fingers 27 terminating in a central piston rod opening 28 and formed by radially slitting the disk from the center opening outwardly to the rim 26. The spring disk inwardly of the rim 26 is concave or dish-shaped as clearly indicated in Fig. 5 and said disk may be formed of any suitable material as for instance sheet metal.

A circular plate 29 for the outer end of the outer or reservoir cylinder 11 is placed outwardly of the spring disk and engages the rim 26 thereof so as to be supported by the rib 21 of the closure plug P. The circumference of the closure plate 29 is provided with an outwardly turned circular flange 30 which interfits the interior of the outer or reservoir cylinder 11, there being a circular notch or recess 31 formed in the outer side of the plate 29 just inwardly of the flange 30 for a purpose later to be explained.

The circular closure plate 29 is provided with a central opening of substantially larger diameter than the diameter of the piston rod 15. A piston packing 32 is mounted in said central opening of the closure plate 29 and is of double conical configuration and tapers inwardly on its opposite sides from the center thereof to its periphery. The packing 32 is provided with a radially extending circular recess into which the closure plate 29 extends so that it is embraced on opposite sides by the circular lips of the peripheral portion of the packing 32. The packing 32 and the closure plate 29 are bonded together by suitable means that provides proper adhesion between the packing and the closure plate as, for instance, by vulcanizing the packing to the closure plate. It will be noted that the packing material extends into the notch or recess 31 of the plate 29.

The packing 32 is provided with a central opening through which the piston rod 15 extends and said opening is provided with a series of annular sharp edged lips 33 extending axially of the piston rod and with said lips tenaciously engaging the piston rod and acting as wiping lips thereon during the reciprocation of the rod as will be well understood.

The spring disk if used has its spring fingers 27 contacting the inner side of the piston packing 32 and tending to urge the packing into gripping contact with the piston rod. The spring disk and the closure plate 29 with the piston packing bonded thereto is held in assembled relationship on the rib 21 of the closure plug P by spinning over the outer end of the outer or reservoir cylinder 11 as indicated at 11a in Fig. 1, with the spun over outer end of the cylinder engaging the rib 30 of the closure plate and extending into sealing engagement with packing material in the annular notch or recess 31 located just inwardly of the rib 30. Consequently a secure assembly and sealing of the parts is readily and easily obtained by the spinning operation just referred to.

It will be seen that as the piston rod reciprocates during the operation of the shock absorber the series of circular lips 33 provide an effective and efficient seal against the escape of hydraulic fluid past the piston packing and said lips function during the outward movement of the piston rod to wipe from the rod the fluid which may have accumulated thereon and such fluid will collect in the concave or dish-shaped outer end 22 of the closure plug P and can return to the reservoir 12 through the grooves 24 and grooves 23.

From the foregoing description it will have been seen that the present invention provides for a simply constructed, easily assembled and efficient closure for the inner or working cylinder and for the outer or reservoir cylinder together with a piston rod packing for the outer end of a direct double acting hydraulic shock absorber and one which is formed of relatively few parts which may be die cast or otherwise formed. Inasmuch as the piston rod packing is bonded to the closure plate 29 there is no likelihood of the hydraulic fluid escaping between the closure plate and the piston packing as would be the case were the usual separate closure plate and piston rod packing employed that were not bonded together into an integrated or unitary assembly.

Although a preferred embodiment of the invention has been illustrated and described herein it will be understood that the invention is susceptible of various modifications and adaptations within the scope of the appended claims.

Having thus described my invention I claim:

1. In a direct double acting hydraulic shock absorber including an inner cylinder and an outer or reservoir cylinder spaced radially outwardly of the inner cylinder with the piston rod extending outwardly of the inner and outer cylinders from one end thereof, closure means for said one end of said cylinders comprising a closure plug having a portion interfitting the inner cylinder at said one end thereof and a portion abutting against said one end of the inner cylinder and interfitting the outer cylinder, said last named portion on its outer side being provided with a circular rib adjacent its circumference, a plate supported by said rib and having a central opening, a piston rod packing mounted in said opening and having continuous lip portions embracing said plate on the opposite sides thereof and bonded to said plate, said piston rod packing being provided with a central opening through which the piston rod extends, and means securing said plate in said outer cylinder and against said rib.

2. In a fluid shock absorber including a cylindrical casing from one end of which a piston rod extends, a unitary closure for said one end and comprising a plate having a central opening and provided on its outer side adjacent its periphery with an outwardly extending circular rib and inwardly of said rib with a circular notch or recess, a piston rod packing formed of resilient material mounted in said opening and having a portion embracing said plate and extending into said circular notch or recess and bonded to said plate, said piston rod packing being provided with a central opening through which the piston rod extends, said one end of said cylindrical casing being spun around said rib and into engagement with the material of the piston rod packing in said circular notch or recess.

3. In a fluid shock absorber including a cylindrical casing from one end of which a piston rod extends, a closure for said one end of the casing and comprising a plate secured in said one end of the casing and having a central opening, and a piston rod packing formed of resilient material mounted in said opening and having a portion embracing said plate and bonded thereto, said piston rod packing being provided with a central opening through which the piston rod extends, and said plate being provided on its outer side adjacent its circumference with an outwardly extending annular rib around which rib the cylindrical casing is spun.

4. In a direct double acting hydraulic shock absorber including an inner cylinder and an outer or reservoir cylinder spaced radially outwardly of the inner cylinder with the piston rod extending outwardly of the inner and outer cylinders from one end thereof, closure means for said one end of said cylinders comprising a closure plug having a portion interfitting the inner cylinder at said one end thereof and a portion abutting against said one end of the inner cylinder and interfitting the outer cylinder, said last named portion on its outer side being provided with a circular rib adjacent its circumference and which rib has a radially extending groove communicating with a groove formed in said last named portion and extending longitudinally of the shock absorber and communicating with the reservoir between the inner and outer cylinders, said last named portion on the side thereof that is provided with said rib being of concave configuration, a plate supported by said rib and having a central opening, a piston rod packing mounted in said opening and having continuous lip portions embracing said plate on the opposite sides thereof and bonded to said plate, said piston rod packing being provided with a central opening through which the piston rod extends, and means securing said plate in said outer cylinder and against said rib.

5. In a direct double acting hydraulic shock absorber including an inner cylinder and an outer or reservoir cylinder spaced radially outwardly of the inner cylinder with the piston rod extending outwardly of the inner and outer cylinders from one end thereof, closure means for said one end of said cylinders comprising a closure plug having a portion interfitting the inner cylinder at said one end thereof and a portion abutting against said one end of the inner cylinder and interfitting the outer cylinder, said last named portion on its outer side being provided with a circular rib adjacent its circumference, a plate supported by said rib and having a central opening, a piston rod packing mounted in said opening and having continuous lip portions embracing said plate on the opposite sides thereof and bonded to said plate, said piston rod packing being of double conical configuration and provided with a central opening through which the piston rod extends, a spring disk having an annular rim interposed between said rib and said plate and provided with a circular series of spring fingers engaging the inner conical end of said packing, and means securing said plate in said outer cylinder and against said rib.

6. In a direct double acting hydraulic shock absorber as defined in claim 5 and wherein said plate on its outer side and at its circumference is provided with an outwardly turned flange while said outer cylinder has its end spun over said flange to secure said plate and spring disk in assembled relationship in the outer cylinder and against the rib of said plug.

References Cited in the file of this patent

UNITED STATES PATENTS

| | | |
|---|---|---|
| 2,106,272 | Elsey | Jan. 25, 1938 |
| 2,182,034 | Oberstadt | Dec. 5, 1939 |
| 2,309,446 | Ekkebus | Jan. 26, 1943 |
| 2,338,162 | Boor | Jan. 4, 1944 |
| 2,360,993 | Whisler | Oct. 24, 1944 |

FOREIGN PATENTS

| | | |
|---|---|---|
| 458,895 | Great Britain | Dec. 29, 1936 |